(12) United States Patent
Nagakura

(10) Patent No.: US 6,719,445 B2
(45) Date of Patent: Apr. 13, 2004

(54) BACK COVER FOR A LAMP BODY

(75) Inventor: Akira Nagakura, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 91 days.

(21) Appl. No.: 09/920,925

(22) Filed: Aug. 2, 2001

(65) Prior Publication Data

US 2002/0024810 A1 Feb. 28, 2002

(30) Foreign Application Priority Data

Aug. 25, 2000 (JP) .................................... P.2000-254933

(51) Int. Cl.[7] .............................................. H01R 33/00
(52) U.S. Cl. ...................... 362/546; 362/544; 362/265; 439/604; 439/606
(58) Field of Search ................................. 362/263, 265, 362/546, 54; 439/604, 606, 559

(56) References Cited

U.S. PATENT DOCUMENTS

| | | | |
|---|---|---|---|
| 4,845,600 A | * | 7/1989 | Matsumura et al. ......... 362/373 |
| 4,859,194 A | * | 8/1989 | Bartholomew .............. 439/125 |
| 4,951,179 A | * | 8/1990 | Machida ..................... 362/800 |
| 4,972,303 A | * | 11/1990 | Machida et al. ............ 362/294 |
| 5,000,695 A | * | 3/1991 | Nishiyama et al. ......... 439/276 |
| 5,050,051 A | * | 9/1991 | Machida et al. ............ 362/268 |
| 5,562,339 A | | 10/1996 | Tanaka et al. |
| 5,664,870 A | | 9/1997 | Uchida et al. |
| 5,686,156 A | * | 11/1997 | Matsui et al. .............. 428/36.6 |
| 5,700,080 A | | 12/1997 | Okuda |
| 5,879,073 A | | 3/1999 | Hori et al. |

FOREIGN PATENT DOCUMENTS

JP          4075444 A   *  3/2002

* cited by examiner

*Primary Examiner*—Thomas M. Sember
(74) *Attorney, Agent, or Firm*—Fish & Richardson PC

(57) ABSTRACT

A structure that ensures air tightness and waterproof performance of a cord insertion hole in a back cover of a lamp body. The arrangement allows a reduction of man hours for fixing a power supply cord to the back cover. In an implementation, a cylindrical outer wall 702 is provided that surrounds cord insertion holes 704*a*, 704*b* through which power supply cords 6*a*, 6*b* are inserted for sending current to light source bulbs 1*a*, 1*b*. A resin mold portion filled inside the outer wall fixes and integrates the power supply cords 6*a*, 6*b* in the cord insertion holes 704*a*, 704*b*. The resin mold portion includes a lower mold layer 9*a* on the side of the cord insertion holes 704*a*, 704*b* that adheres well to the back cover 7, and an upper mold layer 9*b* laminated over the lower mold layer 9*a* and having good heat resistance properties. The upper mold layer 9*b* prevents creep in the lower mold layer 9*a*, and the lower mold layer maintains air tightness and waterproof performance at the cord insertion hole.

9 Claims, 3 Drawing Sheets

BACK COVER FOR A LAMP BODY

BACKGROUND OF THE INVENTION

The present invention ensures air tightness and waterproof performance at a cord insertion hole formed in a back cover for replacing a light source bulb that is mounted at a rear apex portion of a lamp body. The lamp body is a basic component member of a lamp for a vehicle such as an automobile or a motorcycle.

More particularly, the present invention relates to an improvement of a lamp body back cover structure to ensure air tightness and waterproof performance at the cord insertion hole. A cylindrical outer wall is formed around the cord insertion hole in the back cover, filled with a soft synthetic resin and cured in the outer wall, and a power supply cord inserted in the cord insertion hole is fixed by the resin mold portion inside the outer wall.

In general, a back cover for light source bulb replacement is engagingly fixed to a light source bulb insertion opening formed at the rear apex of a generally cup-shaped lamp body that forms a housing of a vehicle lamp such as a headlamp for an automobile or motorcycle.

Conventionally, one or a plurality of power supply cords for supplying current from a power source to a light source bulb disposed inside the housing are inserted and fixed to the back cover for a lamp body. A variety of constructions have been proposed for ensuring air tightness and waterproof performance of the gap formed at the power supply cord insertion portion.

Such constructions typically include, a first construction, as shown in FIG. 4(a), wherein all power supply cords 21a, 21b for supplying current to a light source bulb, not shown, are inserted and fixed to a rubber bushing 22. This rubber bushing 22 is fitted into a predetermined hole 23 formed in a back cover 20a that is engagingly fixed to a lamp body 21. A second construction, which is an improved configuration, is shown in FIG. 4(b), wherein two cord insertion holes 25a, 25b corresponding to the respective power supply cords 21a, 21b are provided in a back cover 20b (partially shown) at intervals, cylindrical protrusions 26a, 26b are provided so as to surround the respective insertion holes 25a, 25b, small rubber bushings 24a, 24b having power supply cords 21a, 21b inserted and fixed therein in advance are fitted into the respective inner regions of the protrusions 26a, 26b, and adhesives 27a, 27b are poured from above the small bushings 24a, 24b so as to provide a seal.

However, in the first construction mentioned above, the engagement areas between the bushing 22 and the cord insertion hole portion, and between the bushing 22 and the back cover hole 23 tended to be large due to the relatively large bushing 22 used therein. Also, sufficient air tightness and waterproof performance are not obtained due to a difference in material of the rubber bushing 22 and the synthetic resin back cover 20a. Further, technical problems existed such as that fitting the bushing required some effort and automation was not possible.

In the second construction, the assembly work (installing the power supply cord) required a step for inserting and fixing a power supply cord 21 to a bushing 24, a primer processing step for the lamp body, a step for inserting the bushing 24, and a step for filling an adhesive 27. This resulted in a large number of working man hours. Further, there existed technical problems such as that the fixing force of the power supply cord 21 is weak due to the fact that the adhesive 27 is filled from above the bushing 24.

SUMMARY OF THE INVENTION

The present invention has been devised in order to solve the drawbacks of the prior art. Particularly, the present invention provides a back cover for a lamp body that ensures air tightness and waterproof performance at the power supply cord insertion location in the back cover for a lamp body of a vehicle lamp, while reducing man hours required for fixing the power supply cord to the back cover.

Means described hereunder are adopted in order to achieve the above-mentioned result.

In the back cover for a lamp body first, a cylindrical outer wall protrudes from a back face of the back cover so as to surround the cord insertion hole for inserting the power supply cord that supplies current to the light source bulb. Then, a soft synthetic resin (hot melt resin) is filled inside a space formed by the outer wall, and the power supply cord is inserted in the cord insertion hole and fixed and integrated by this resin mold portion. The resin mold portion has such a structure that an upper mold layer with good heat resistance is laminated over a lower mold layer on the cord insertion hole side that adheres well to the back cover. With this means, the structure is such that no bushing member is used in inserting and fixing the power supply cord to the back cover. Accordingly, the steps of inserting the power supply cord with respect to the bushing or installing and fixing the bushing can be eliminated. As a result, the number of man hours required to install the power supply cords can be reduced and the work automated while air tightness and waterproof performance can be ensured with a simple method of plugging the cord insertion hole portion with a synthetic resin. Also, since the resin mold portion has such a structure that an upper layer with good heat resistance and high rigidity is laminated over and integrated with a lower mold layer on the cord insertion hole side that adheres well to the back cover, generation of creep in the resin mold portion (lower mold layer) is prevented by the upper mold layer having good heat resistance and high rigidity, whereby adhesion between the lower mold layer and the back cover is maintained. Further, to form a layer-structured resin mold portion, first, a soft synthetic resin (hot melt resin), for example, for the lower mold layer is filled. After it has cured to some extent, a soft synthetic resin (hot melt resin), for example, for the upper mold is filled and cured. In the back cover for a lamp body, the back cover may be made of polypropylene, the lower mold layer may be made of an olefin or synthetic rubber based hot melt agent, and the upper mold layer may be made of a polyamide based hot melt agent, respectively. The olefin or synthetic rubber based hot melt agent that forms the lower mold layer on the cord insertion hole side adheres well with the polypropylene back cover. The upper mold layer made of polyamide hot melt agent laminated over and integrated with the lower mold layer adheres to the lower mold layer, has good heat resistance, reliably prevents the generation of creep in the lower mold layer, and reliably maintains the adhesion of the lower mold layer with the back cover. A back cover for a lamp body may be structured such that a ratio of a thickness of the lower mold layer and a thickness of the upper mold layer is 2 to 1. Since the thickness of the lower mold layer that adheres well to the back cover is twice that of the upper mold layer, adhesion in a region two thirds of an adhesion area with the outer wall on the lower layer side of the resin mold portion is maintained. With the back cover for lamp body, the power supply cord may be coated with a polyethylene based resin. The polyethylene based resin (coated portion of the power supply cord) adheres well to the olefin or synthetic rubber based hot melt agent that forms the lower mold layer on the cord insertion hole side, and adhesion of the lower mold layer to the back cover and the power supply cord is maintained.

Now, preferred embodiments of the present invention will be described with reference to the attached drawings.

DETAILED DESCRIPTION

Figure 1:
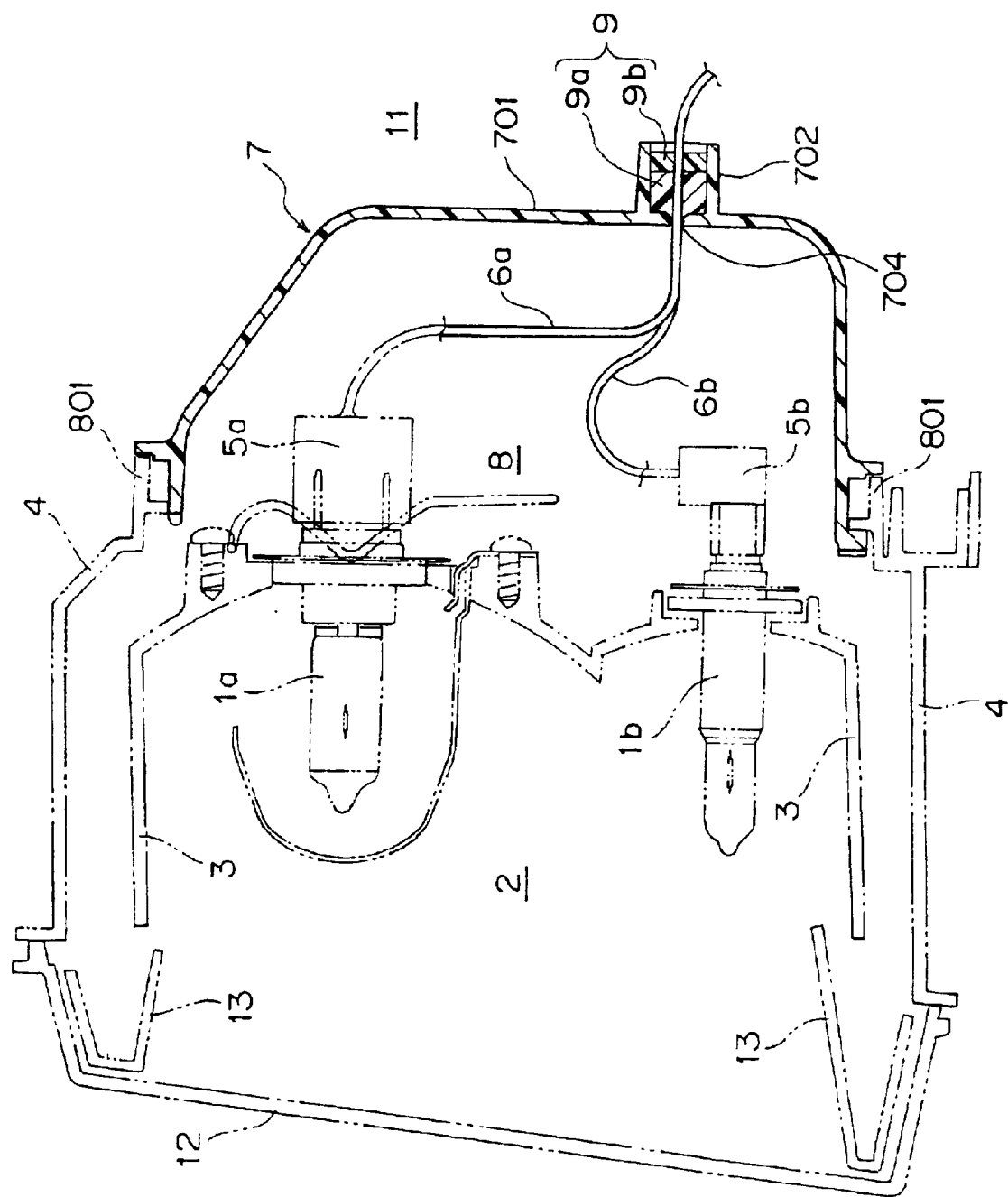
FIG. 1 is a longitudinal sectional view of the back cover for a lamp body according to the present invention, shown in a state where the back cover is installed on the lamp body.
Figure 2:
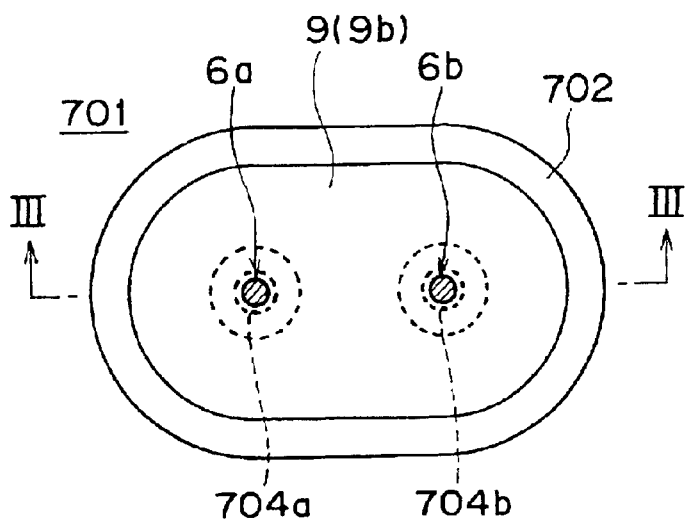
FIG. 2 is a front view of an outer wall surrounding a cord insertion hole.
Figure 3A:
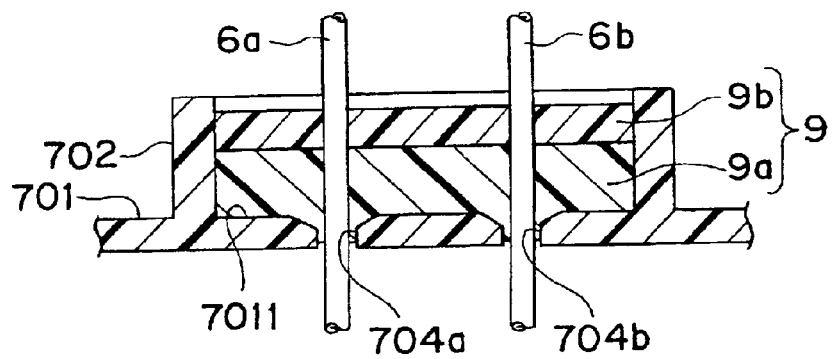
FIG. 3A is an illustration of a first construction.
Figure 3B:
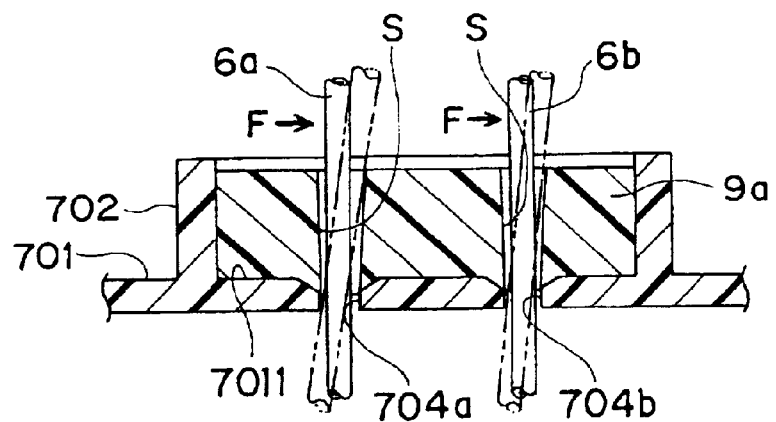
FIG. 3B is an illustration of a second construction.
Figure 4A:
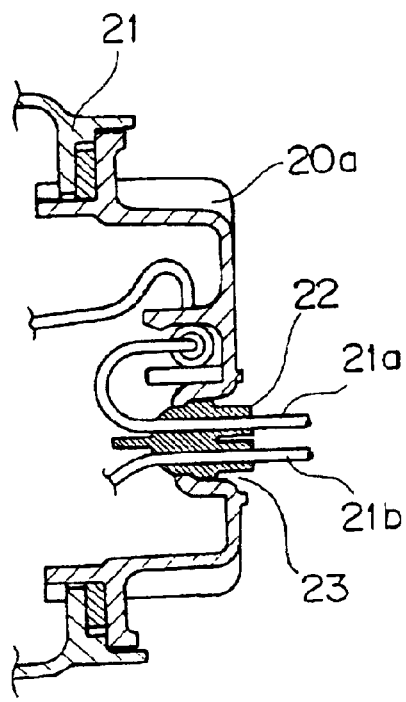
FIG. 4A illustrates a first prior art construction.
Figure 4B:
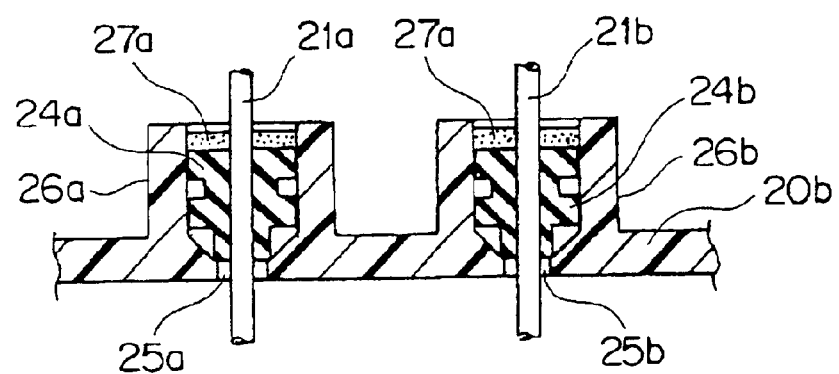
FIG. 4B illustrates a second prior art construction.

FIG. 1 is a longitudinal sectional view of a back cover for a lamp body (hereafter simply referred to as the "back cover") according to the present invention. The back cover is installed on a lamp body, using a headlamp of an automobile as an example embodiment. FIG. 1 includes a side view of an outer wall surrounding a cord insertion hole, FIG. 2 is a front view of the outer wall surrounding the cord insertion hole, FIG. 3(a) is a sectional view of a resin mold portion (a sectional view taken along line III—III of FIG. 2), and FIG. 3(b) is a sectional view to illustrate creep generated in a resin mold portion formed independently of an olefin based hot melt layer. Referring to FIG. 1, a housing 2 is formed inside a lamp body 4. A front lens 12 (reference numeral 13 refers to an extension reflector), and two light source bulbs (halogen lamps) 1a, 1b are disposed at the top and bottom in a state fixed to a rear apex of a paraboloid reflector 3.

Connectors 5a, 5b of the light source bulbs 1a, 1b are connected to power supply cords 6a, 6b that supply current from a power source, not shown, to the light source bulbs 1a, 1b. Specifically, the two power supply cords 6a, 6b are inserted into a pair of cord insertion holes 704a, 704b (see FIG. 2) formed in a back face 701 of a generally cup-shaped back cover 7. The back cover is engagingly fixed to a peripheral edge portion 801 of a light source bulb replacement opening 8 provided at the rear apex of the lamp body 4. The power supply cords 6a, 6b that extend into the housing 2 through the cord insertion holes 704a, 704b are connected to the rear end portions of the light source bulbs 1a, 1b through connectors 5a, 5b.

The type and number of the light source bulbs 1a, 1b, the installation method of the back cover 7 to the peripheral edge portion 801, the shape of the back cover 7, and the number of cord insertion holes 704, and the like, are selectable as appropriate. Therefore, such elements do not affect the substance of the present invention in any way.

At positions surrounding the cord insertion holes 704a, 704b on the back face 701 of the back cover 7, an elliptic cylindrical outer wall 702 protruding perpendicularly backward from the back face 701 of the back cover 7 is formed. A resin mold portion 9 is formed by filling and curing soft synthetic resin (hot melt resin) inside the outer wall 702. The resin mold portion 9 fixes and integrates the power supply cords 6a, 6b inserted in the cord insertion holes 704a, 704b to the back cover 7. Further, the resin mold portion 9 seals the cord insertion holes 704a, 704b. Reference numeral 7011 in FIG. 3 corresponds to a bottom face of a hole surrounded by the outer wall 702 and is level with the back face 701.

The back cover 7 may be made of glass fiber reinforced polypropylene so as to enhance rigidity, while the resin mold portion 9 has a laminated structure consisting of a lower mold layer 9a which is an olefin based hot melt layer that adheres well to the polypropylene back cover 7, and an upper mold layer 9b which may be a polyamide based hot melt layer having good heat resistance.

The olefin based hot melt layer which is the lower mold layer 9a facing the side of the cord insertion holes 704a, 704b adheres well to the polypropylene back cover 7. The upper mold layer (polyamide based hot melt layer) 9b laminated over and integrated with the lower mold layer (olefin based hot melt layer) 9a adheres to the lower mold layer 9a. Further, since the upper mold layer has good heat resistance and high rigidity, the generation of creep in the lower mold layer (olefin based hot melt layer) 9a is reliably prevented. Consequently, adhesion between the lower mold layer (olefin based hot melt layer) 9a and the back cover 7 is reliably maintained.

The structure of the power supply cords 6a, 6b is such that the power supply cords 6a, 6b are coated with a polyethylene based resin that adheres well to the olefin based resin. The power supply cords 6a, 6b inside the outer wall 702 adhere closely to the lower mold layer 9a (olefin based hot melt layer) of the resin mold portion 9, thereby ensuring air tightness and waterproof performance between the power supply cords 6a, 6b and the resin mold portion 9.

The olefin based hot melt agent that forms the lower mold layer 9a is injected inside the outer wall 702 at a predetermined volume to form the resin mold portion 9 in the outer wall 702, in a state where the power supply cords 6a, 6b are inserted in the cord insertion holes 704a, 704b. The power supply cords 6a, 6b are immovably retained with respect to the outer wall 702 at positions where the lengths of the power supply cords 6a, 6b on the housing 8 side are predetermined lengths. When the injected olefin based hot melt agent becomes tack-free, the polyamide based hot melt agent that forms the upper mold layer 9b is injected inside the outer wall 702 at a predetermined volume. Then, the upper mold layer 9b cures, and the resin mold layer 9, in which the upper mold layer 9b is laminated over and integrated with the lower mold layer 9a, is formed.

FIG. 3(b) shows a structure in which the power supply cords 6a, 6b are fixed and integrated by a resin mold portion formed independently of the olefin based hot melt layer 9a obtained by filling and curing the olefin based hot melt agent. In a mode in which the power supply cords 6a, 6b are oriented sideways, a lateral load as shown by an arrow F was applied and the power supply cords 6a, 6b were left at a high temperature for a long time. As a result, due to creep, gaps S communicating with the cord insertion holes 704a, 704b formed around the power supply cords 6a, 6b, deteriorating the air tightness and waterproof performance.

A test was conducted under the same conditions with the present embodiment, and no gap formed in the lower mold layer (olefin based hot melt layer) 9a by creep. Accordingly, it was confirmed that the air tightness and waterproof performance are ensured (See FIG. 3(a)).

A further test conducted by the inventors found that a ratio of the thickness of the lower mold layer 9a to the upper mold layer 9b of 2 to 1 is suitable.

In the present embodiment, the lower mold layer 9a is formed by filling and curing the olefin based hot melt agent, however, instead of the olefin based hot melt agent, However, the lower mold layer 9a may be made of a rubber layer obtained by filling and curing a synthetic rubber based hot melt agent that adheres well to the back cover 7.

In the above-mentioned embodiment, a back cover used with a head lamp having a halogen bulb as a light source has been described. However, the present invention is particularly effective (in protecting the resin mold portion of the power supply cord insertion hole) for a back cover of a lamp having a discharge bulb such as a metal halide bulb as a light source, in which the temperature inside the lamp housing becomes higher than that with the halogen bulb when lighted.

In the back cover for lamp body, a soft synthetic resin is filled and cured inside the outer wall and is provided so as to surround the power supply cord inserted through the cord insertion hole. Consequently, a bushing member is totally unnecessary for inserting and fixing the power supply cord. As a result, the work of installing the power supply cord to the back cover is simplified or facilitated.

The conventionally used rubber bushing member and the synthetic resin back cover differed in material, which meant that a gap tended to form at an engagement portion therebetween. Thus, it was difficult to ensure air tightness and waterproof performance. However, by adopting a simple method of plugging the cord insertion hole portion of the back cover with a resin mold portion formed by filling and curing synthetic resin, it becomes possible to easily ensure air tightness and waterproof performance.

Further, adhesion between the lower mold layer and the back cover is maintained by the upper mold layer laminated over and integrated with the lower mold layer. The lower mold layer has good heat resistance and high rigidity, thereby ensuring air tightness and waterproof performance at the cord insertion hole. In addition, adhesion between the back cover and the olefin based or synthetic rubber based hot melt agent which is a lower mold layer is reliably maintained, which ensures air tightness and waterproof performance at the cord insertion hole. Further, adhesion in two thirds of an adhesion area with the outer wall on the lower layer side of the resin mold portion is maintained. Yet further, adhesion between the back cover and the olefin based or synthetic rubber based hot melt agent which is a lower mold layer is maintained, whereby the air tightness and waterproof performance at the cord insertion hole is further ensured.

A vehicle lamp provided with a back cover for a lamp body according to the present invention having the above-mentioned effects provides improved quality regarding air tightness and waterproof performance.

What is claimed is:

1. A back cover for a lamp body that includes a cord insertion hole for inserting a power supply cord for supplying current to a light source bulb, and a cylindrical outer wall surrounding the cord insertion hole constructed to enable the power supply cord to be fixed and integrated by a resin mold within the outer wall, comprising:

a resin mold portion formed from a first resin mold layer having a first surface on the cord insertion hole side, said first layer adhered to the back cover and having a second surface opposite to the first surface; and a second resin mold layer laminated to the second surface of the first mold layer.

2. A back cover for a lamp body according to claim 1, wherein the back cover is made of polypropylene, the first resin mold layer is made of at least one of an olefin based and a synthetic resin based synthetic rubber hot melt agent, and the second resin mold layer is made of a polyamide based hot melt agent.

3. A back cover for a lamp body according to claims 1 or 2, wherein a ratio of thickness between the first mold resin layer and the second mold resin layer is two to one.

4. A back cover for a lamp body according to claim 1, wherein the power supply cord is coated with a polyethylene based resin.

5. A method for forming a waterproof seal about a power supply cord in a back cover of a lamp body comprising:

inserting the power supply cord through a cord insertion hole in the back cover of a lamp body;

forming a first resin mold layer in a cylindrical outer wall that forms a well that surrounds the cord insertion hole with a predetermined amount of soft synthetic resin; and laminating a second resin mold layer on the first resin mold layer.

6. An apparatus, comprising:

a cover that includes a hole and a wall to form a well surrounding the hole;

a cord passed through the hole;

a first resin mold layer formed within the well and surrounding the cord to cover the hole, said first layer having a first surface adhered to the cover and having a second surface opposite to the first surface; and a second resin mold layer laminated to the second surface of the first mold layer.

7. The apparatus of claim 6, wherein the cover is made of polypropylene, the first resin mold layer is made of at least one of an olefin based and a synthetic resin based synthetic rubber hot melt agent, and the second resin mold layer is made of a polyamide based hot melt agent.

8. The apparatus of claim 6, wherein the a ratio of thickness between the first mold resin layer and the second mold resin layer is two to one.

9. The apparatus of claim 7, wherein the a ratio of thickness between the first mold resin layer and the second mold resin layer is two to one.

* * * * *